United States Patent

[11] 3,600,099

[72] Inventor Dietmar M. Schoeffel
 Hillsdale, N.J.
[21] Appl. No. 26,309
[22] Filed Apr. 7, 1970
[45] Patented Aug. 17, 1971
[73] Assignee Schoeffel Instrument Corp.
 Westwood, N.J.
 Continuation-in-part of application Ser. No.
 710,151, Mar. 4, 1968, now abandoned.

[54] THIN LAYER CHROMATOGRAPHIC APPARATUS
 FOR COMPARING A SAMPLE AND A REFERENCE
 13 Claims, 9 Drawing Figs.
[52] U.S. Cl.................................................. 356/206,
 250/209, 250/219 FR, 356/212, 356/244
[51] Int. Cl....................................................G01n 21/22,
 G01n 21/30

[50] Field of Search............................................ 356/36,
 195, 206, 212, 203, 244; 250/219 FR

[56] References Cited
 UNITED STATES PATENTS
 2,145,591 1/1939 FitzGerald................... 356/206

Primary Examiner—Ronald L. Wibert
Assistant Examiner—Orville B. Chew, II
Attorney—Samuelson and Jacob ABSTRACT: Apparatus for the optical comparison of a moving reference and sample applied to a moving, thin layer, chromatographic plate having a light source, a monochromator, means for splitting the beam from the light source which is transmitted through the monochromator, means for applying the split beam to the closely adjacent reference and sample, means for detecting the ratio between the optical characteristics of the reference and the sample, and means for displaying the ratio.

PATENTED AUG 17 1971

INVENTOR.
DIETMAR M. SCHOEFFEL
BY
HIS ATTORNEYS

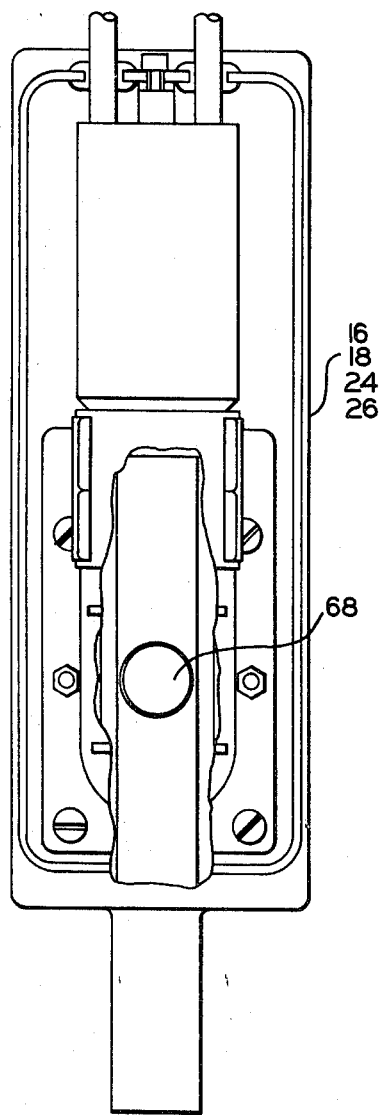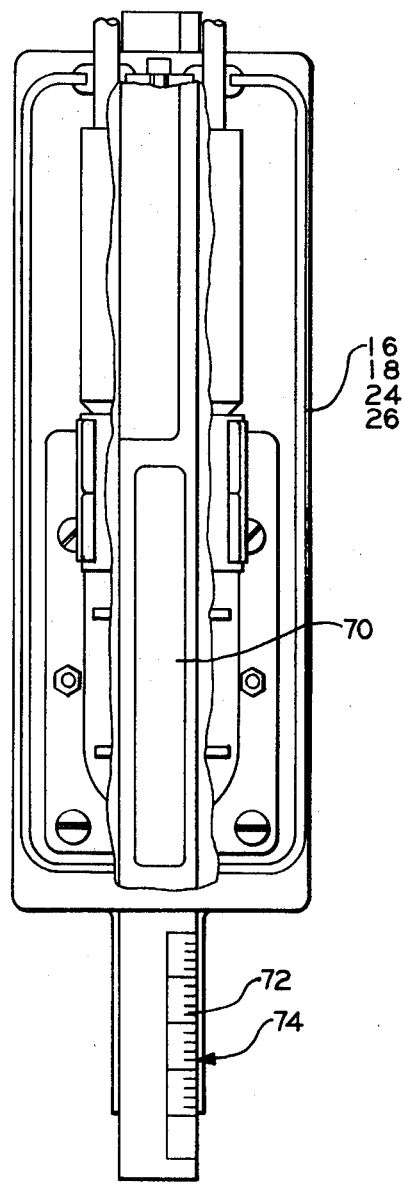
Fig. 4
Fig. 5
INVENTOR.
DIETMAR M. SCHOEFFEL

INVENTOR.
DIETMAR M. SCHOEFFEL
BY
Sennelson & Jacob
HIS ATTORNEYS

THIN LAYER CHROMATOGRAPHIC APPARATUS FOR COMPARING A SAMPLE AND A REFERENCE

This application is a continuation-in-part of my copending application Ser. No. 710,151, filed Mar. 4, 1968 and now abandoned.

The invention relates to apparatus for measuring optical characteristics of transparent or semitransparent substances in liquid, semiliquid or solid form and, in particular, to those measurement in the field of thin layer, paper, gelatin, acetate glass or disc chromatography. Basic thin layer chromatographic plates are formed of a glass plate coated with an adsorbent. Since these coatings are applied by means of longitudinal spreaders, on encounters a certain percentage of waviness in the applied adsorbent substance. This waviness can cause transmittance and light scattering variations of the order of up to 25 percent in the basic adsorbent.

Similar transmittance errors can be encountered if the adsorbents are applied to the plate by spraying or dipping processes. Paper strips, which consist of normal filter or other papers also exhibit thickness changes or other inconsistencies due to the variations in the fiber density. These inconsistencies are also present in gelatine slabs which are made by pouring or other methods.

As a consequence, a certain error is present in all think layer chromatography unless steps are taken to minimize the inconsistencies which are inherent in the basic plate. The present invention is directed toward providing apparatus which will consider the inherent defects in the plates and other thin layer materials and will render them useful for accurate measurement of the optical density or transmission of the adsorbed or migrated chemicals or substances. This is accomplished by using the basic adsorbent as a reference and comparing the optical characteristics of the sample against those of the basic adsorbent. For such a system to be accurate, it is necessary to minimize the effects of the unevenness in the basic plate or strip. This is accomplished by keeping the reference and the sample close together physically while preventing any migration of the sample into the area of the reference. Accordingly, it is an important object of the invention to provide apparatus for optically reading the transmitted or reflected characteristics of the light from the reference and the sample, in motion, while precluding the light from one of them from being detected by the elements used for the other.

It is a further object of the invention to provide such apparatus wherein the measured light is reflected from the closely adjacent reference and sample areas in motion.

It is a still further object of the invention to provide such apparatus wherein the measured light is transmitted through the reference and the sample.

It is still another object of the invention to provide such apparatus wherein the ratio of the two light signals are compared and the comparison ratio is visually displayed.

It is still a further object of the invention to provide such apparatus wherein the width of the light beams applied to the reference and the sample are accurately controlled.

These and other objects, advantages, features and uses will be apparent during the course of the following description, when taken in conjunction with the accompanying drawings, wherein:

FIG. 4 is a top view of one of the photomultipliers showing a filter in place;

FIG. 5 is a view similar to that of FIG. 4 showing an interference wedge in place;

Figure 1:
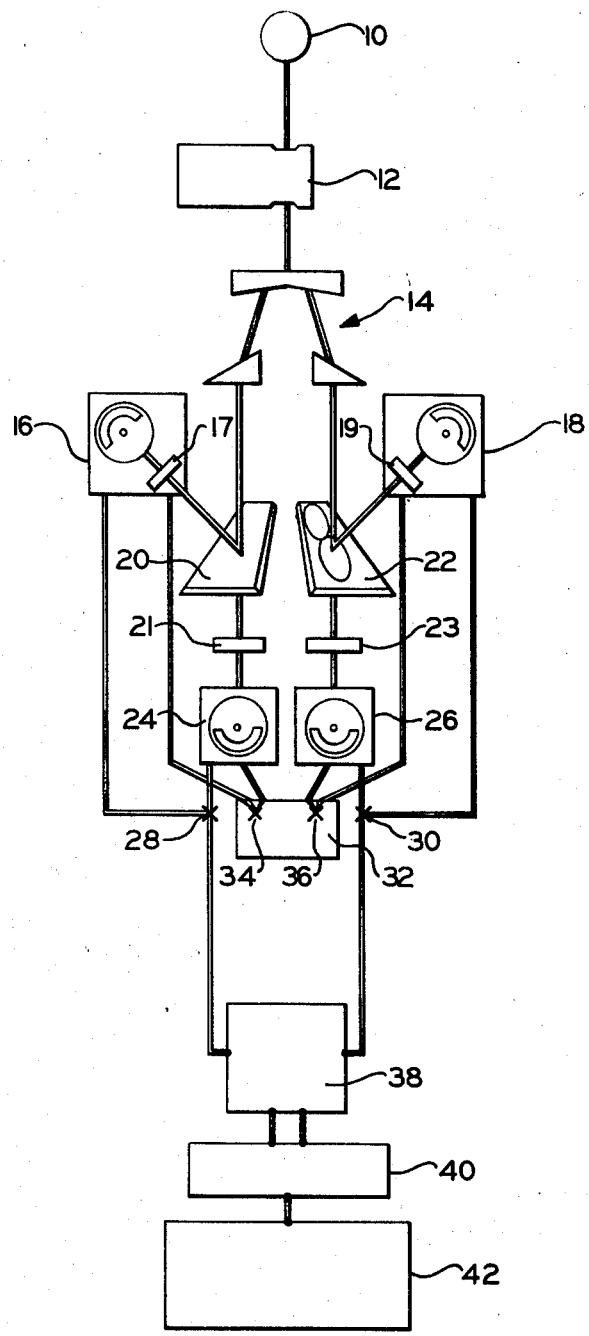
FIG. 1 is a schematic block diagram of the apparatus of the invention.
Figure 2:
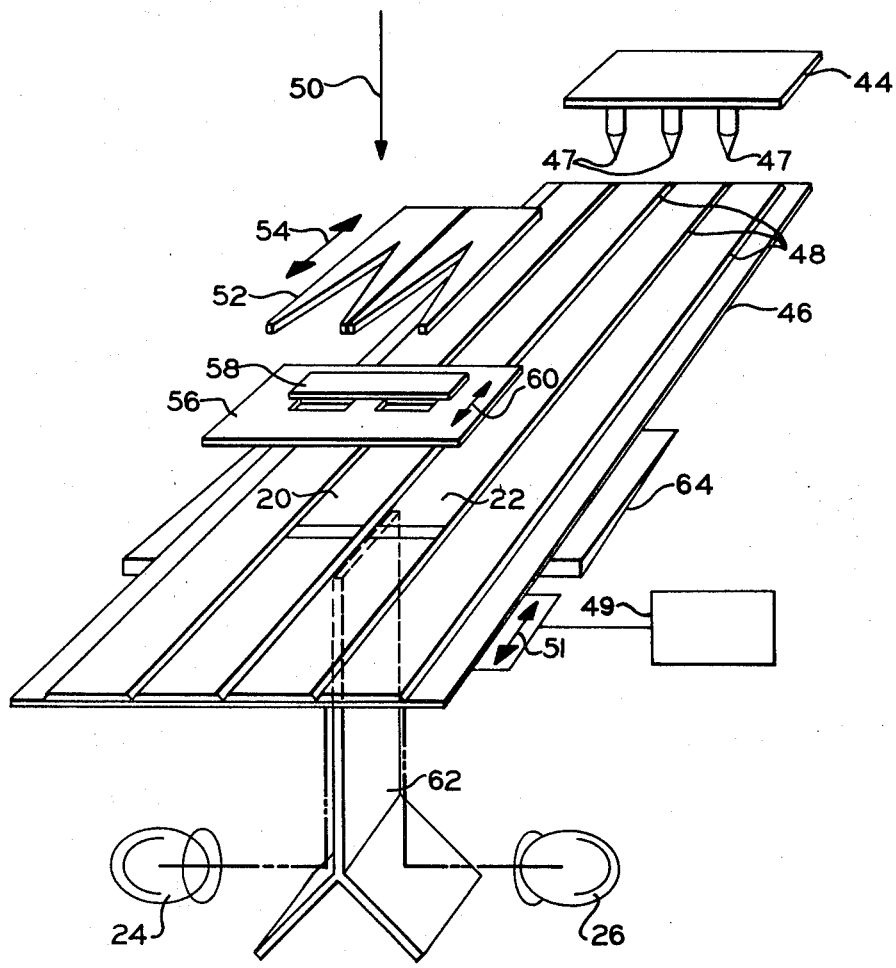
FIG. 2 is an exploded view, in perspective, of one embodiment of the invention.

In the drawings, wherein, for the purpose of illustration, are shown preferred embodiments of the invention, and wherein like numerals designate like parts throughout the same, the numeral 10 designates a source of light (FIG. 1). Light from the light source is transmitted though monochromator 12 and thence through beam splitter 14. The monochromator and the beam splitter are devices which are standard in the art and are used to provide a pair of monochromatic light beams which are applied to both the reference strip and the sample.

The reference strip has been designated as 20 and the sample strip as 22. If measurements are to be made by using the light reflected by the reference strip, and the sample, photomultipliers 16 and 18 are used. If measurements are to be made by using the light transmitted through the reference strip and the sample, then photomultipliers 24 and 26 are used.

Power is supplied to the photomultipliers by a standard power supply 32 which feeds either the photomultipliers 16 and 18 or 24 and 26. This condition is indicated diagrammatically by the marks at the junctions 34 and 36. It should be noted that the apparatus of the invention is not always provided with both sets of photomultipliers but rather that it may be supplied with either set or one set may be removed and the other set used for a particular measurement.

Photomultipliers 16, 18, 24, and 26 are used in conjunction with interference wedges or filters which are inserted at points 17, 19, 21 and 23, respectively. The interference wedges or filters serve to control the wavelength of the light transmitted therethrough. The outputs of the photomultipliers 16 and 18 or the outputs of the photomultipliers 24 and 26 are applied to ratio determinator 38. The schematic representation of the alternate use of either the reflected measurements of the photomultipliers 16 and 18 or the transmission measurements of photomultipliers 24 and 26 is shown by the marks at the junctions 28 and 30.

Ratio determinator 38 compares the two amplified light signals from the reference and sample photomultipliers to produce a ratio signal which is linear in form. The ratio determinator may be a simple ratio recorder which produces a linear signal display for transmission or fluorescence measurements. Its circuitry is well known in the art, and therefore, its details are not discussed herein. The reference and sample signal outputs of the photomultipliers can also be made available by through switching to the density computer 40 which is of a type well known in the art and which converts the two linear outputs into a log output. The log output is then linearized electronically and the linear output spreads the critical measurements over a longer scale and permits the user to obtain a more accurate determination of the characteristics of the sample. For maximum benefit, the output of computer 40 is fed to indicator 42 which is, for example, a recording voltmeter and permits the user to obtain a permanent record to the measurements and also permits linear integration of areas under the obtained curves.

One of the important features of the apparatus of the invention is its ability to keep the reference beam and the sample beam in extreme proximity. Since the media, which are used as adsorbents for various chemicals and substances, are not absolutely smooth and uniform throughout their total extent, it is necessary to keep the two beams as close together as possible. By keeping them close together, there is a minimum variation in measurement due to the characteristics of and changes in the material from spot to spot on the plate.

To keep the two beams close together, the apparatus includes scoring fixture 44 which cuts grooves 48 in plate 46. Scoring fixture 44 may be permanently affixed to the frame of the apparatus or it may be either removable or a completely separate accessory. Scoring is accomplished by placing its pins or knives 47 in contact with plate 46 and moving scorer 44 in the direction of dual arrow 51.

After the plate has been suitably scored, and the sample has been applied to strip 22, light is directed downward in the direction of arrow 50 toward strips 20 and 22. If the reference and sample beams yield the same transmissivity, the readout will produce a ratio of sample divided by reference = 1, which is the equivalent of 100 percent transmission. The separation of the plate into strips by scoring results in the two adjacent strips (sample and reference) having closely identical characteristics before the sample is applied. The substances to be separated and measured are applied to the sample strip 22 and developing solvents are applied to strips 20 and 22. Now, the stage (plate or sample holding element) is moved by a suitable motor 49 in the direction of arrow 51 so that the full lengths of the strips are optically examined. If it is desirable to examine a particular spot on the sample, the scanning motor may be stopped so that the state is stationary. Any suitable drive means, such as chain and sprocket or pulley and belt, may be used to couple the motor to the stage.

To control the width of the light beams applied to the strips being examined, a dual wedge 52, which may be adjusted in the longitudinal direction 54 is provided. For further slit width control, a plate 56 which carries a movable aperture control 58, movable in the direction 60, is used to adjust the reference and sample widths simultaneously.

Splitter 62 precludes the beam from the reference or sample from affecting the other photomultiplier. For some measurements, dual or single e.g. fluorescence, interference wedges 64 are also employed.

The light source is of either the closed or open arc type such as Carbon, Xenon or Xenon-Mercury illumination units but any suitable source may be used. It can be readily understood that the beam wavelength and width is carefully controlled by the use of the interference wedges, optical filters or the monochromator and the split apertures. Because of the close proximity of the strips, it is possible to produce closely adjacent and dimensionally repeatable samples and reference strips of the greatest possible similarity.

The exit light from the beam apertures is semicollimated and the photomultipliers are placed at an appropriate distance so as to intercept a control led cone of integrated energy. Furthermore, because of the extremely close proximity of the centers of the two beams, a single monochromator light source may be used.

Figure 3:
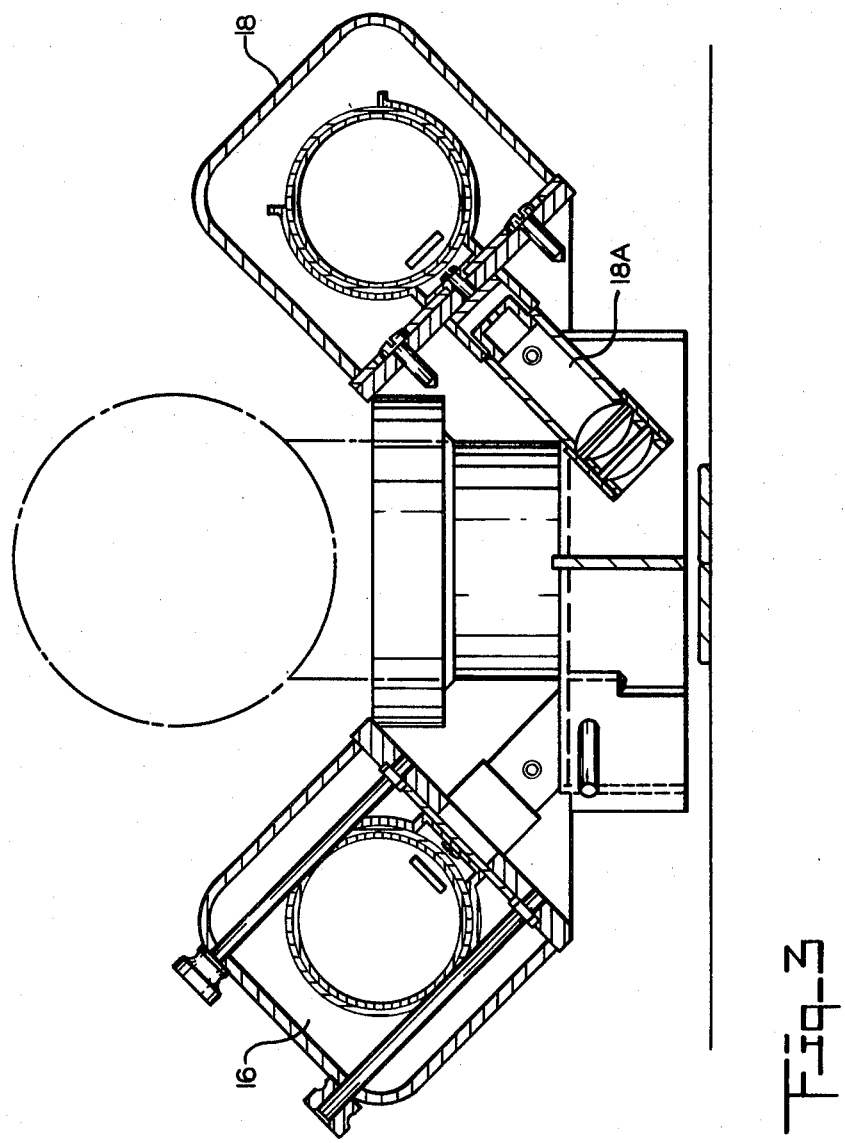
FIG. 3 is an elevational view, with portions exposed, of a pair of photomultipliers used in the apparatus of the invention.

FIG. 3 shows the photomultipliers 16 and 18. Photomultiplier 18 has been cut away to show its lens system 18A. Photomultipliers 24 and 26 are of similar construction and since all of the multipliers are of a type well known in the art, the details of their construction will not be discussed here. FIG. 4 is a top view of a photomultiplier used in the apparatus of the invention showing a filter 68 inserted in the path of the light beam. FIG. 5 is a view similar to that of FIG. 4 showing an interference wedge 70 inserted in the path of the light beams. Indicia 72 and reference point 74 are provided to facilitate repeatability of the interference wedge settings.

Figure 6:
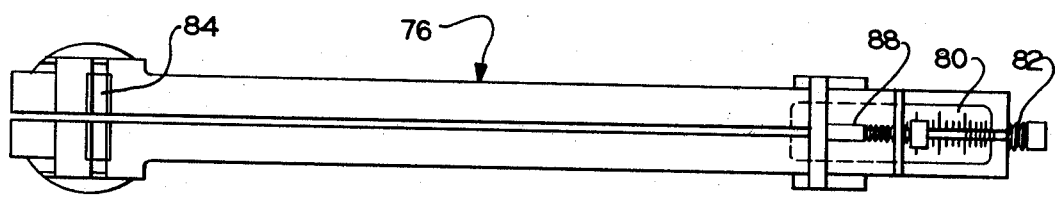
FIG. 6 is a plan view of the substage, slit width, adjustment means used with the apparatus of the invention.
Figure 7:
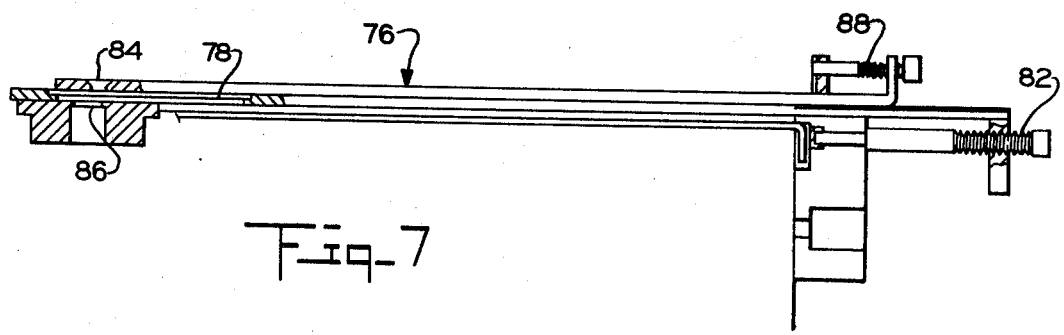
FIG. 7 is an elevational view of the substage, slit width, adjustment means of FIG. 6.

FIG. 6 is a plan view and FIG. 7 is an elevational view of a dual interference, wedge assembly 76 which may be permanently mounted on the apparatus below the chromatographic strip on what is commonly called a substage.

Assembly 76 comprises an interference wedge 78 with appropriate indicia 80 and a threaded control 82. The interference wedge 78 will control the light wavelength and the cooperating slits 84 and 86 will control the beam width.

Figure 8:
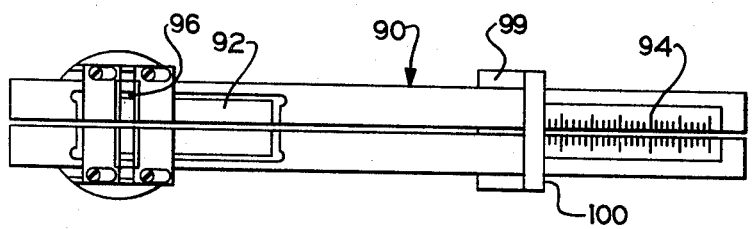
FIG. 8 is a view similar to that of FIG. 6 of an alternate embodiment of slit width adjustment which may be used with the apparatus of the invention.
Figure 9:
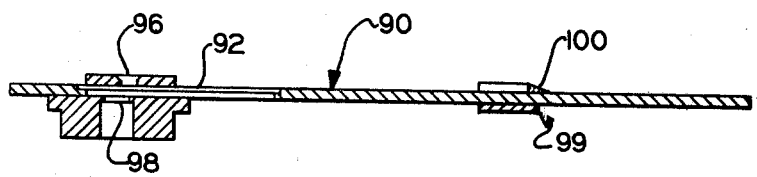
FIG. 9 is a view similar to that of FIG. 7 of the device of FIG. 8.

FIGS. 8 and 9 are similar to FIGS. 6 and 7 and are views of a portable substage wedge monochromator which may be used as desired. Assembly 90 comprises interference wedge 92, indicia 94 and slits 96 and 98. Adjustment of the position of the interference wedge and of the slit width is accomplished by sliding it through indicator block 99 to any desired position as indicated by the vernier-line on transparent element 100.

While particular embodiments of the apparatus of the invention have been shown and described, it is apparent to those skilled in the art that modifications are possible without departing from the spirit of the invention and the scope of the subjoined claims.

The embodiments of the invention in which an exclusive property or privilege I claim are defined as follows:

1. Apparatus for optically comparing and measuring the optical characteristics of moving references and samples present on or in a thin layer chromatographic plate comprising:
   a light source;
   a monochromator through which light from the light source is transmitted;
   means for splitting the beam from the monochromator into at least two separate beams so that one of the separate beams impinges on sample, reference and the other separate beam impinges on the sample;
   means for moving the chromatographic plate so that the beams impinge on successive portions along the reference and sample;
   means for continuously detecting the optical characteristics of the sample and means for continuously detecting the optical characteristics of the reference;
   means for determining the ratio of the optical characteristics of the reference to the optical characteristics of the sample; and
   means for displaying the said ratio.

2. The invention of claim 1 wherein:
   the means for detecting the optical characteristics of the reference is a photomultiplier which measures the reflected optical characteristics of the reference; and
   the means for measuring the optical characteristics of the sample is a photomultiplier which measures the reflected optical characteristics of the sample.

3. The invention of claim 2 including:
   means connected between the means for determining the ratio of the optical characteristics and the means for displaying the said ratio linearly or logarithmically; and
   means for converting the said ratio into a linear function for linear integration thereof.

4. The invention of claim 3 including:
   correction means inserted in the light beam between the reference and the photomultiplier associated therewith for controlling the frequency of the light applied to the photomultiplier; and
   correction means inserted in the light beam between the sample and the photomultiplier associated therewith for controlling the frequency of the light applied to the photomultiplier.

5. The invention of claim 4 wherein:
   at least one of the correction means is a filter.

6. The invention of claim 4 wherein:
   at least one of the correction means is an interference wedge.

7. The invention of claim 2 including;
   means for adjusting the width of the light beams impinging on the reference and the sample.

8. The invention of claim 1 wherein:
   the means for detecting the optical characteristics of the reference is a photomultiplier which measures the transmitted optical characteristics of the reference; and
   the means for detecting the optical characteristics of the sample is a photomultiplier which measures the transmitted optical characteristics of the sample.

9. The invention of claim 8 including:
   means connected between the means for determining the ratio of the optical characteristics and the means for displaying the said ratio linearly or logarithmically; and
   means for converting the said ratio into a linear function.

10. The invention of claim 9 including:
    correction means inserted in the light beam between the reference and the photomultiplier associated therewith for controlling the frequency of the light applied to the photomultiplier; and correction means inserted in the light beam between the sample and the photomultiplier associated therewith for controlling the frequency of the light applied to the photomultiplier.

11. The invention of claim 10 wherein:
at least one of the correction means is a filter.

12. The invention of claim 10 wherein:
at least one of the correction means is an interference wedge.

13. The invention of claim 8 including;
means for adjusting the width of the light beam impinging on the reference and the sample.